(12) United States Patent
Laurandel et al.

(10) Patent No.: US 7,608,971 B2
(45) Date of Patent: Oct. 27, 2009

(54) BRUSH-HOLDER FOR A CARBON BRUSH

(75) Inventors: Hervé Laurandel, Saint Clair (FR); Philippe Raoul, Fresne la Mere (FR)

(73) Assignee: Meritor Light Vehicle Systems - France, Sully-sur-Loire (FR)

( * ) Notice: Subject to any disclaimer, the term of this patent is extended or adjusted under 35 U.S.C. 154(b) by 77 days.

(21) Appl. No.: 11/593,737

(22) Filed: Nov. 7, 2006

(65) Prior Publication Data
US 2007/0052320 A1    Mar. 8, 2007

Related U.S. Application Data

(62) Division of application No. 10/297,335, filed on Dec. 4, 2002, now Pat. No. 7,193,349.

(51) Int. Cl.
*H02K 5/14* (2006.01)
*H02K 13/00* (2006.01)
*H01R 39/39* (2006.01)

(52) U.S. Cl. ............... 310/242; 310/245; 310/248; 310/40 MM

(58) Field of Classification Search ............. 310/238, 310/239, 242, 245, 248, 40 MM
See application file for complete search history.

(56) References Cited

U.S. PATENT DOCUMENTS 2,822,487 A * 2/1958 Barel ................... 310/239
3,087,081 A * 4/1963 Apostoleris ........... 310/239
3,482,135 A * 12/1969 Hurlin ................. 310/239
3,584,248 A * 6/1971 Higashino et al. ...... 310/239

(Continued)

FOREIGN PATENT DOCUMENTS

DE    3627491 A1 * 2/1988

(Continued)

OTHER PUBLICATIONS

Information provided is from Manufacturing Processes Reference Guide by Robert H. Todd, Dell K. Allen, and Leo Alting.—1st ed. Published by Industrial Press Inc., 1994.*

(Continued)

*Primary Examiner*—Quyen Leung
*Assistant Examiner*—David W. Scheuermann
(74) *Attorney, Agent, or Firm*—Carlson, Gaskey & Olds

(57) ABSTRACT

An electric motor, in particular a motor and gear box unit for activating functional equipment in a vehicle, includes a rotor shaft (1) carrying a commutator (2) co-operating with conductive brushes (3) disposed in brush supports (4) fixed to a printed circuit card (5); the motor is provided with means for enabling brush supports to be fixed to the printed circuit card solely by surface mounting. These means may comprise, for each brush (3), a metal casing (6) containing the brush and having one wall (6) with at least one transverse tab (11) adapted to pass through the printed circuit card in order to position and hold the casing on the card and in order to provide an electrical connection. The invention enables brush-support devices to be fixed to the printed circuit card solely by surface mounting, thus making it pointless to perform an additional flow soldering operation as is required in the prior art.

22 Claims, 3 Drawing Sheets

U.S. PATENT DOCUMENTS

| | | | | |
|---|---|---|---|---|
| 3,710,160 | A * | 1/1973 | Voglesonger | 310/247 |
| 3,924,147 | A * | 12/1975 | Tamow et al. | 310/239 |
| 4,074,162 | A * | 2/1978 | Parzych | 310/245 |
| 4,088,912 | A * | 5/1978 | Yoshida | 310/244 |
| 4,404,488 | A | 9/1983 | Herr | |
| 4,596,941 | A * | 6/1986 | Kluck | 310/239 |
| 4,774,430 | A * | 9/1988 | Rodriguez et al. | 310/239 |
| 4,851,730 | A * | 7/1989 | Fushiya et al. | 310/239 |
| 5,034,640 | A * | 7/1991 | Shimizu | 310/71 |
| 5,196,750 | A * | 3/1993 | Strobl | 310/239 |
| 5,319,277 | A * | 6/1994 | Materne et al. | 310/239 |
| 5,397,952 | A * | 3/1995 | Decker et al. | 310/242 |
| 5,563,462 | A * | 10/1996 | Strobl et al. | 310/71 |
| 5,780,952 | A * | 7/1998 | Lau | 310/239 |
| 5,949,173 | A * | 9/1999 | Wille et al. | 310/220 |
| 6,271,615 | B1 * | 8/2001 | Morimoto et al. | 310/239 |
| 6,465,920 | B2 * | 10/2002 | Harita et al. | 310/71 |
| 6,603,235 | B1 * | 8/2003 | Kimura | 310/239 |
| 6,680,556 | B2 * | 1/2004 | Menz et al. | 310/239 |
| 6,822,367 | B1 * | 11/2004 | Uchida et al. | 310/242 |

FOREIGN PATENT DOCUMENTS

| | | | |
|---|---|---|---|
| DE | 3726689 A1 * | 4/1988 | |
| DE | 42 15 446 | 11/1992 | |
| EP | 874424 A2 * | 10/1998 | |
| FR | 2582872 | 12/1986 | |
| FR | 2582872 A * | 12/1986 | |
| FR | 2582872 A1 * | 12/1986 | |
| FR | 2763753 | 11/1998 | |
| GB | 2214358 A * | 8/1989 | |
| JP | 55068846 A * | 5/1980 | |
| JP | 57-75549 | 5/1982 | |
| JP | 61-273147 | 12/1986 | |
| JP | 06315251 A * | 11/1994 | |
| JP | 09131034 A * | 5/1997 | |
| JP | 10-108402 | 4/1998 | |
| JP | 10108402 A * | 4/1998 | |
| JP | 10108403 A * | 4/1998 | |

OTHER PUBLICATIONS http://www.lescon.biz/pth.html.*

* cited by examiner

BRUSH-HOLDER FOR A CARBON BRUSH

REFERENCE TO RELATED APPLICATIONS

This application is a divisional application of U.S. Ser. No. 10/297,335, which was filed on Dec. 4, 2002 now U.S. Pat. No. 7,193,349.

The present invention relates to a motor and gear box unit, in particular a unit for driving functional equipment in a vehicle, e.g. for closing a window, moving a seat, opening a roof, . . . .

The electric motor includes a rotor shaft provided with a commutator that co-operates with conductive brushes disposed in brush supports fixed to a printed circuit card for feeding electricity. The support device for each brush is relatively complex and in a known embodiment comprises a metal cage with a spring for holding the brush pressed against the commutator. The components of the metal cages constituting the brush supports pass through the printed circuit card in order to be fixed thereto, and they are secured to the card by a flow soldering operation performed over a bath of liquid metal.

An object of the invention is to simplify the mounting and assembly of brush supports on the printed circuit card in order to eliminate the additional flow soldering operation and to provide a corresponding decrease in the cost of manufacturing the motor.

In accordance with the invention, the electric motor is provided with means enabling brush supports to be fixed to the printed circuit card solely by surface mounting.

Such surface fixing avoids any need to pass the metal cages for supporting brushes through the card, thus making it pointless to perform an additional soldering operation on the opposite face of the card.

In an embodiment of the invention, said means comprise, for each brush, a metal casing containing the brush and having a wall that is contiguous with the printed circuit card with at least one transverse tab adapted to pass through the printed circuit card so as to position and hold said casing on said card and so as to provide a good electrical connection.

In an advantageous embodiment, two transverse positioning tabs are provided in this way: these tabs serve not only to hold the brush support on the printed circuit card, but also to conduct electricity, and in addition they withstand the force exerted on the brush by the commutator.

The tab(s) may be mounted by force in the card, may be coated in a solder paste, and may be processed in an oven in conventional manner.

In a variant, it is also possible to mount the tab by force in a plated through hole of the card, so as to provide an electrical connection.

Other features and advantages of the invention appear from the following description made with reference to the accompanying drawings which show various embodiments as non-limiting examples.

Figure 1:
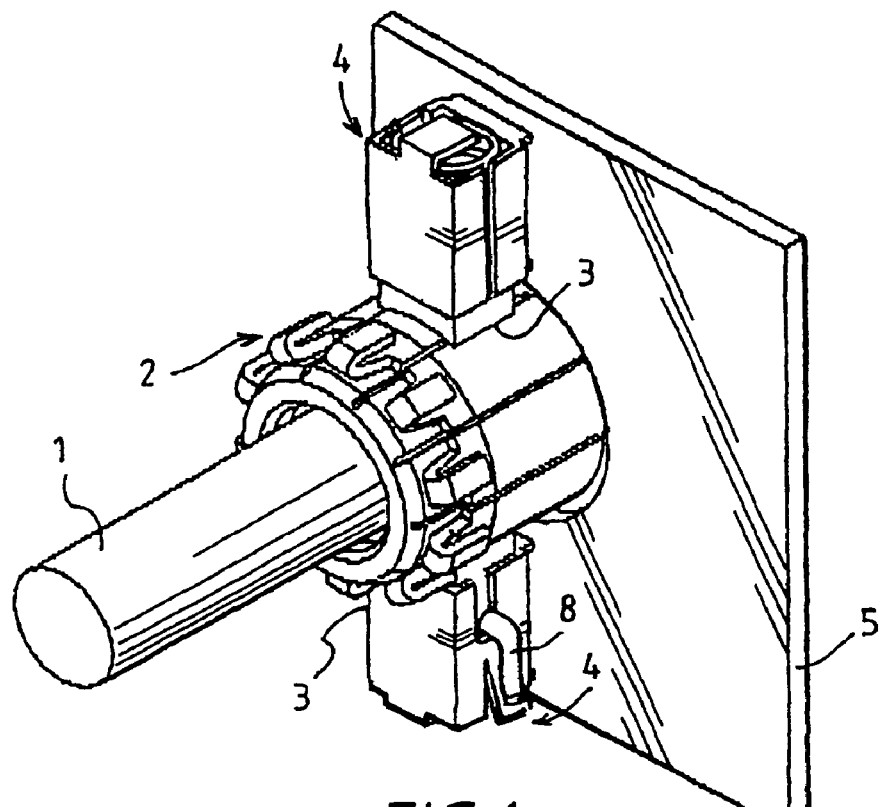
FIG. 1 is a substantially lifesize fragmentary perspective view of an electric motor of the invention, showing a first embodiment of its device for mounting supports for brushes placed so as to bear against a coaxial commutator on the shaft of the rotor.
Figure 2:
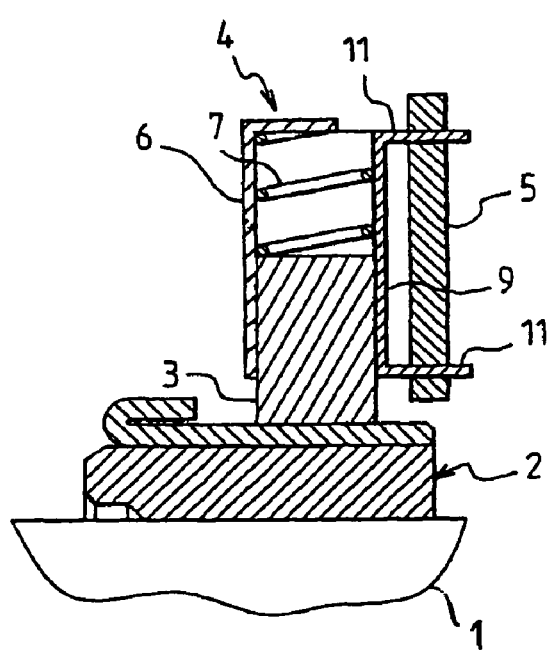
FIG. 2 is an axial longitudinal section view through one of the FIG. 1 brush-support devices, on a larger scale.

The electric motor shown in part in FIGS. 1 and 2 can be constituted in particular by a motor and gear box unit for driving functional equipment in a vehicle. It has a shaft 1 of a rotor (not shown), the shaft carrying a commutator 2 which co-operates with two diametrically opposite conductive brushes placed in brush supports 4 that are fixed to a printed circuit card 5 extending perpendicularly to the longitudinal axis of the rotor 1.

The other elements constituting the electric motor are well known in themselves and are therefore not shown.

This electric motor is fitted with means enabling supports 4 for the brushes 3 to be fixed to the printed circuit card 5 solely by surface mounting, without the support proper passing through the card. In the embodiment shown, these means comprise, for each brush 3, a metal casing 6 forming a cage and containing the corresponding brush 3 together with a spring 7 for applying thrust to the brush 3 so as to keep it pressed conductively against the commutator 2.

The spring 7 may be helical as shown, and it bears against the end wall of the casing 6. The brush 3 has a conductive metal braid 8 fixed thereto. A wall 9 of the cage 6 which is contiguous with the printed circuit card 5 has at least one transverse tab 11 adapted to pass through the card 5 so as to position and hold the casing 6 thereon 5, and so as to provide an electrical connection. In the embodiment shown in FIG. 2, the wall 9 that is parallel to the card 5 is thus fitted with two end tabs 11, e.g. made by stamping, and serving to ensure that the cage 4 is properly positioned and also to provide electrical conduction. In addition, the tabs 11 serve to withstand the force developed by the pressure of the brush 3 against the commutator 2.

Figure 3:
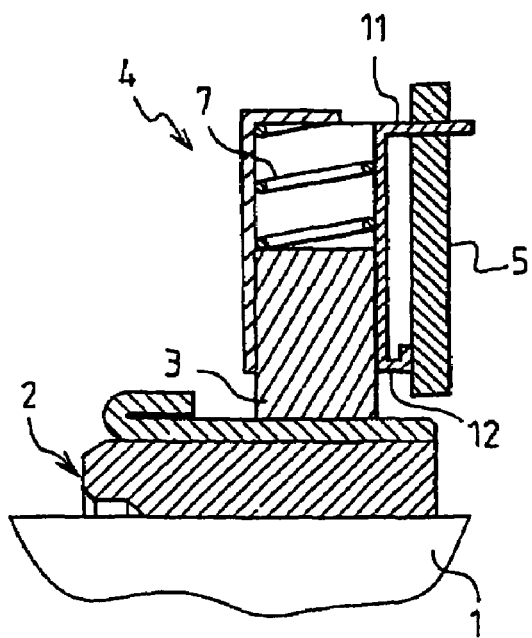
FIG. 3 is a view analogous to FIG. 2 showing a variant embodiment of the brush-holder device.

In the variant embodiment shown in FIG. 3, the device for supporting the brush 3 has only one positioning and electrical conduction tab 11 that passes through the card 5. The second tab 11 is replaced by a folded tab 12 that bears against the surface of the printed circuit card 5 without passing through it. This tab 12 is used for conducting electricity after it has been soldered to the printed circuit card 5 on being passed through an oven, and also for enabling the cage 4 to press against the card 5.

In both of the embodiments of FIGS. 2 and 3, the tabs 11 can be fixed to the printed circuit card 5 in two different ways:

a) either they are forced through the card 5 and then coated in solder paste and treated in an oven in conventional manner;

b) or else the tabs 11 are forced into respective plated-through holes of the printed circuit card 5 so as to provide an electrical connection.

Figure 4:
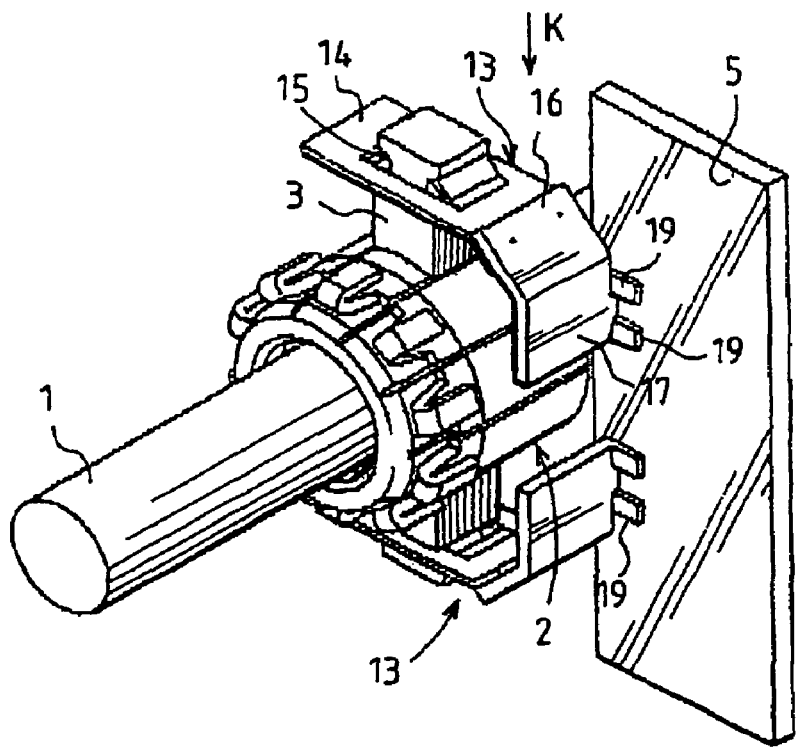
FIG. 4 is a fragmentary perspective view analogous to FIG. 1 showing a second embodiment of the electric motor of the invention.
Figure 5:
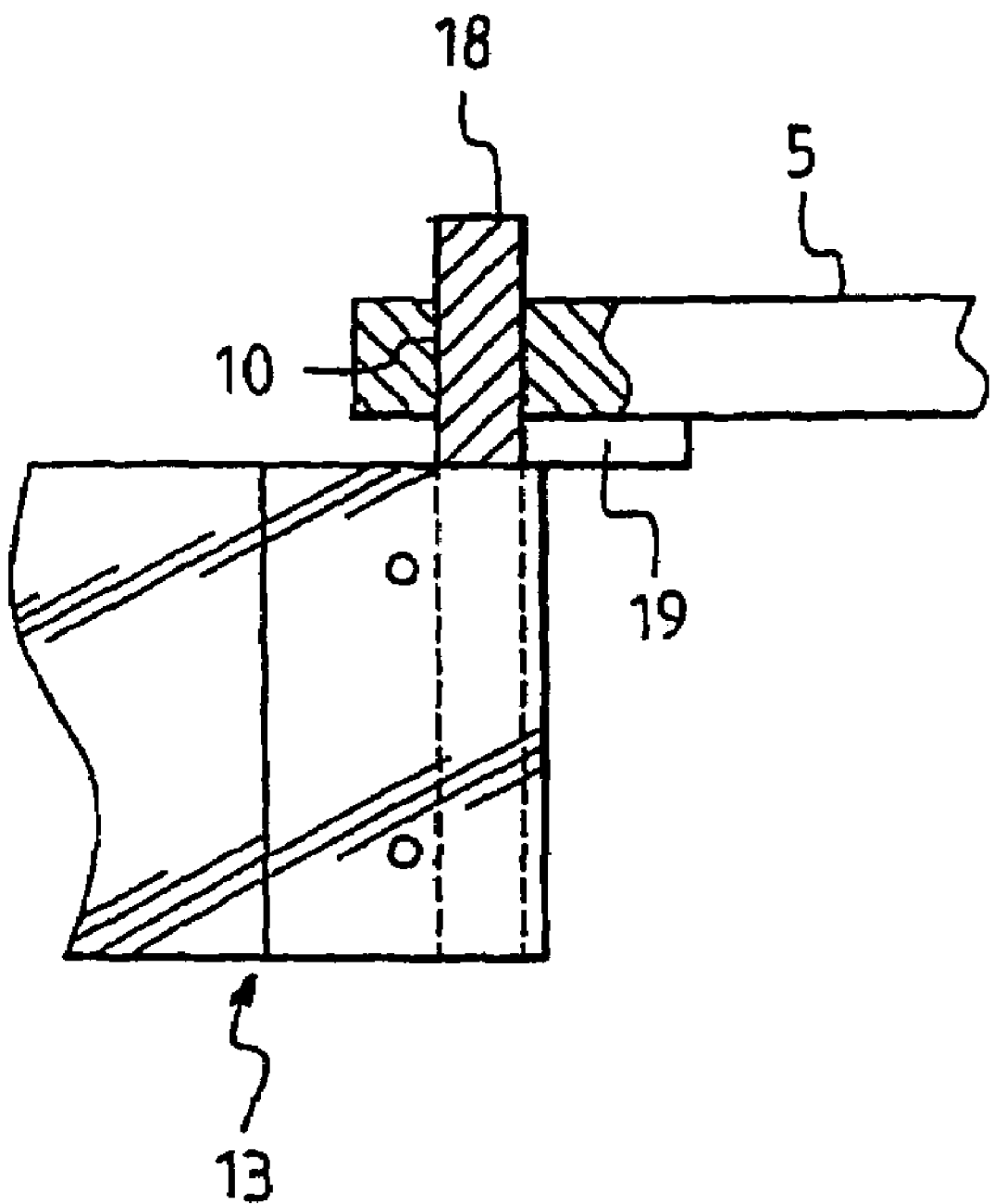
FIG. 5 is a fragmentary plan view seen looking along arrow K in FIG. 4 and on a larger scale.

In the second embodiment of the electric motor shown in FIGS. 4 and 5, the means for fixing each brush 3 to the printed circuit card 5 comprise a support constituted by a resilient arm 13 fixed firstly to the card 5 and secondly to the brush 3. This support arm 13 is constituted in the example shown by a first rectangular segment 14 pierced with an opening 15 enabling the segment or plate 14 to be snapped onto a suitably shaped end of the brush 3, a second segment 16 that is inclined relative to the first segment 14, and a third segment 17 that is also inclined, at an obtuse angle, relative to the second segment 16. The set of three segments 14, 16, 17 surrounds part of the commutator 2. Two arms 13 are thus disposed symmetrically on opposite sides of the commutator 2.

Each arm 13 carries a positioning tab 18 that is forced through a hole 10 in the printed circuit card 5, together with at least one electrically conductive finger 19 fixed to face the printed circuit card 5. In the example shown, the device thus has two conductive fingers 19 for each arm 13, which fingers are fixed by a solder paste and after being passed through an oven in conventional manner.

The tab 18 ensures that the brush-carrier arm 13 is properly positioned relative to the card 5 and withstands the force developed by the brush 3 pressing against the commutator 2.

In a possible variant, the hole 10 is plated-through so as to enable electricity to be conducted by the tab 18. In this variant, the conductive fingers 19 can therefore be omitted.

The force developed by pushing the brushes 3 against the commutator 2, which force must be withstood by the brush-support device, is of the order of a few newtons.

Other conventional techniques for soldering surface-mounted components may be used.

In the various possible embodiments of the invention, the elements constituting supports for the brushes 3 do not pass through the printed circuit card 5, only one or more positioning and electricity conductivity tabs pass through it. As a result, the additional operation of flow soldering that is required in the prior art is eliminated, thereby simplifying mounting of brush supports and reducing overall manufacturing cost.

The invention claimed is:

1. An electric motor for activating functional equipment in a vehicle, the electric motor comprising:
    a rotor shaft carrying a commutator cooperating with at least two conductive brushes;
    a printed circuit card; and
    at least two brush supports that each house one of the at least two conductive brushes and are fixed to the printed circuit card, wherein each of the at least two brush supports forms a casing for the one of the at least two conductive brushes, wherein each of the casings includes a first segment having an opening which receives the one of the at least two conductive brushes, a second segment inclined relative to the first segment and a third segment inclined relative to the second segment, and
    wherein the third segment of each of the casings includes at least one first tab that bears against the printed circuit card without passing through the printed circuit card, wherein the printed circuit card defines a plane, and the first segment, the second segment, the third segment, and the at least one first tab are located on a common side of the plane.

2. The electric motor as recited in claim 1, wherein the first segment is substantially perpendicular to the third segment.

3. The electric motor as recited in claim 1, wherein the at least one first tab is an electrically conductive finger fixed to the printed circuit card.

4. The electric motor as recited in claim 1, wherein each of the casings is metal.

5. The electric motor as recited in claim 1, wherein each of the casings includes a second tab that is transverse to the at least one first tab and that passes through the printed circuit card to position and hold the casings on the printed circuit card.

6. The electric motor as recited in claim 5, wherein the at least one first tab is substantially perpendicular to the second tab.

7. The electric motor as recited in claim 5, wherein the third segment of each of the casings includes the second tab.

8. The electric motor as recited in claim 1, wherein the at least one first tab is located entirely on one side of the plane defined by the printed circuit card.

9. The electric motor as recited in claim 1, wherein the at least one first tab is substantially perpendicular to the third segment.

10. The electric motor as recited in claim 1, wherein the casings partially surround the commutator.

11. The electric motor as recited in claim 1, wherein the rotor shaft has a longitudinal shaft that is substantially perpendicular to the printed circuit card.

12. The electric motor as recited in claim 1, wherein the first segment is connected to the second segment, and the second segment is connected to the third segment.

13. The electric motor as recited in claim 1, wherein the first segment and the third segment are substantially perpendicular, and the second segment is located between the first segment and the third segment and contacts both the first segment and the second segment.

14. The electric motor as recited in claim 1, wherein the at least one first tab is fixed to the printed circuit card by a solder paste.

15. The electric motor as recited in claim 1, wherein the casings are resilient.

16. The electric motor as recited in claim 1, wherein the third segment is inclined relative to the second segment at an obtuse angle.

17. The electric motor as recited in claim 5, wherein the second tab is substantially parallel to the third segment.

18. The electric motor as recited in claim 5, wherein the third segment includes the second tab.

19. The electric motor as recited in claim 5, wherein the second tab extends entirely through the printed circuit card.

20. The electric motor as recited in claim 16, wherein the first segment is inclined relative to the second segment at an obtuse angle.

21. The electric motor as recited in claim 1, wherein the first segment and the at least one first tab are located on opposite sides of the third segment.

22. The electric motor as recited in claim 1, wherein the at least one tab contacts the printed circuit card.

* * * * *